United States Patent

Epstein et al.

[15] 3,663,837

[45] May 16, 1972

[54] TRI-STABLE STATE CIRCUITRY FOR DIGITAL COMPUTERS

[72] Inventors: George Epstein, Malibu; Hideki Yamanaka, Los Angeles, both of Calif.

[73] Assignee: International Telephone and Telegraph Corporation, New York, N.Y.

[22] Filed: May 24, 1971

[21] Appl. No.: 146,034

[52] U.S. Cl. ................................307/289, 307/291, 328/205
[51] Int. Cl. ..........................................................H03k 3/14
[58] Field of Search .........................307/209, 291, 292, 289; 328/205

[56] References Cited

UNITED STATES PATENTS 3,281,805 10/1966 Perry ................................307/289 X
3,593,034 7/1971 Omote ..............................307/289 X

*Primary Examiner*—John Zazworsky
*Attorney*—C. Cornell Remsen, Jr., Walter J. Baum, Paul W. Hemminger, Charles L. Johnson, Jr. and Thomas E. Kristofferson

[57] ABSTRACT

A tri-stable circuit preferably instrumented in solid state components. The circuit resembles a modified ECCLES-JORDAN "flip-flop" with an extra stage providing a third stable state. The circuit responds to the combination of three input logic values, each in straightforward binary form. Three unique logical output combinations also in binary form are available in response to a like number of possible input combinations.

8 Claims, 1 Drawing Figure

Patented May 16, 1972 3,663,837
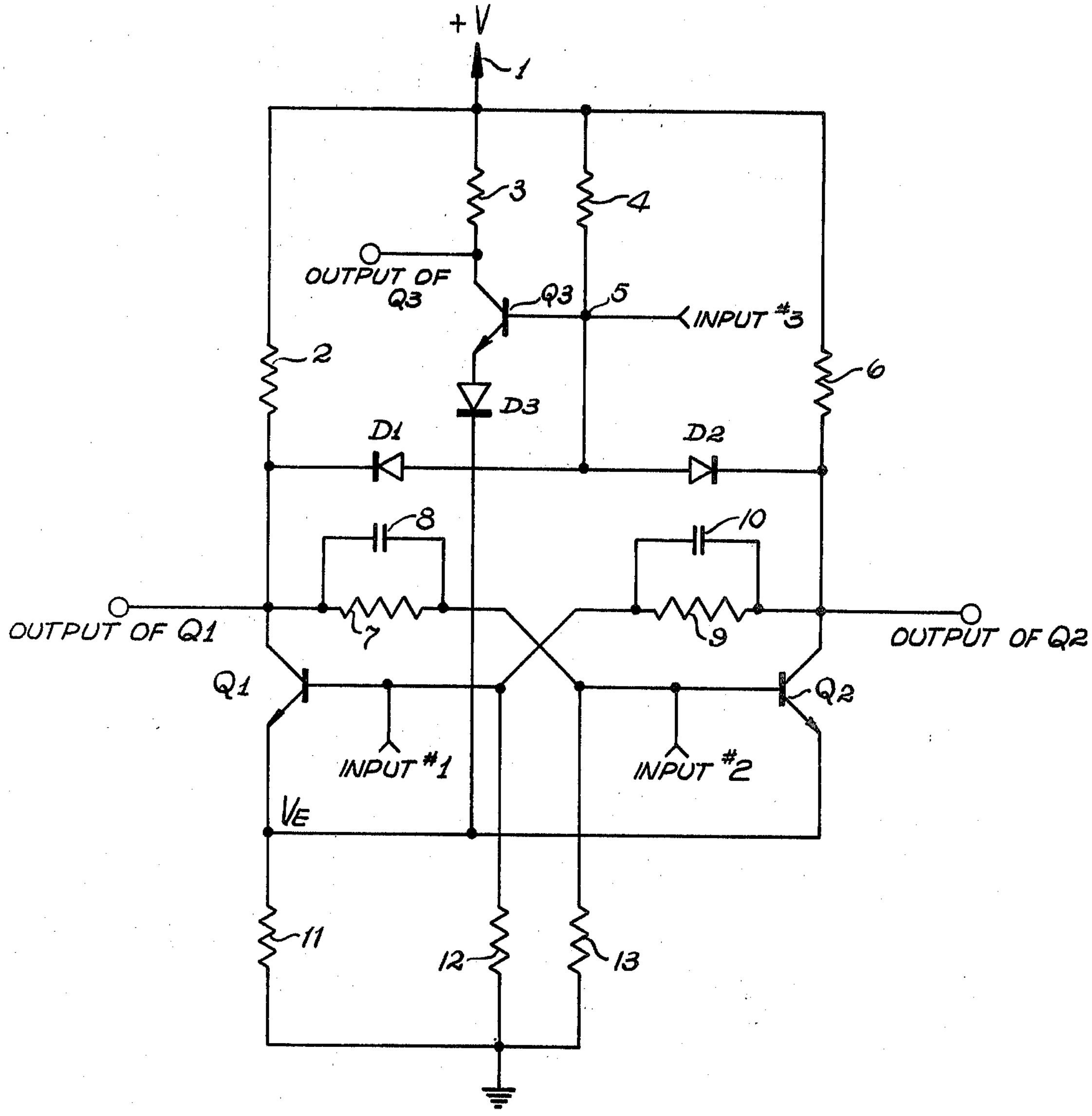
INVENTORS
GEORGE EPSTEIN
HIDEKI YAMANAKA
BY William T. O'Neil
AGENT

TRI-STABLE STATE CIRCUITRY FOR DIGITAL COMPUTERS

BACKGROUND OF THE INVENTION

1. Field of The Invention

The present invention relates to multiple-valued logic design circuitry in binary, digital computers. More particularly, the present invention relates to a tri-stable device for use in such computers.

2. Description of The Prior Art

In the prior art the concept of multi-valued logic systems has been examined by various designers ever since digital computers have taken their place as complex and versatile problem-solving machines for scientific and business applications.

Multi-logic digital computer systems inherently require multi-valued logic circuitry. To fulfill those requirements, various circuits, including tri-stable designs, functionally comparable to the present invention have been generated. Usually however, these have presented the disadvantage of high "hardware count" because of unused states and the seemingly irreducible minimum number of electronic parts and elements required for their instrumentation. Moreover, in addition to the inherent inefficiency of high "hardware count" designs, there have frequently been built-in excessive delays in switching to the next desired state in such prior art devices. Also, prior art systems have usually involved three level input and/or output logic, it being an advantage for integration into binary computer systems to have binary input and output characteristics, as is the case with the present invention to be described.

SUMMARY

In consideration of the aforementioned disadvantages of the prior art, it may be said to have been the objective of the present invention to provide a more efficient ternary logic element in the form of a tri-stable "flip-flop" with outputs each providing binary coding.

The truth table for a tri-stable device in accordance with the present invention is as follows:

| INPUTS No. 1 | No. 2 | No. 3 | OUTPUTS Q1 | Q2 | Q3 |
|---|---|---|---|---|---|
| 1 | 1 | 1 | Unchanged | | |
| 1 | 1 | 0 | 0 | 0 | 1 |
| 1 | 0 | 1 | 0 | 1 | 0 |
| 0 | 1 | 1 | 1 | 0 | 0 |
| Two or more 0's | | | Undefined | | |

The invention employs a unique circuit and method of providing emitter coupling between the first two and the third transistor stage. The detailed description to follow will provide a full understanding of the details of the circuit and its operation.

BRIEF DESCRIPTION OF THE DRAWING

A single drawing depicting an electrical schematic circuit of the present invention is presented.

DESCRIPTION OF THE PREFERRED EMBODIMENT

Examination of the truth table hereinabove will disclose that the circuit of the drawing is adapted to accept binary inputs and provides binary outputs. That is to say, that each of the three inputs is capable of functioning with a "zero" representing input or a "one" representing input in standard binary fashion, and each output is similarly capable of providing a "zero" or "one" representing binary output in accordance with the truth table.

At the outset it will be recognized that the circuit and circuit elements associated with Q1 and Q2, specifically, resistors 2, 6, 7, 9, 11, 12 and 13, and capacitors 8 and 10 constitute a relatively straightforward "flip-flop" or bistable circuit of the ECCLES-JORDAN type. Added to this basic circuit is a third transistor Q3 (of the NPN type, as are Q1 and Q2). A collector resistor 3 feeds the collector of Q3 from the common positive supply voltage terminal 1, the latter also feeding resistors 2 and 6, which are the collector resistors Q1 and Q2, respectively. Resistor 11 will be seen to be the common emitter resistor for all three transistor stages.

The function of the "flip-flop" interconnection provided between Q1 and Q2 by resistors 7 and 13 coupling from the collector of Q1 to the base of Q2, and also the function of resistors 9 and 12 coupling from the collector of Q2 to the base of Q1 are well understood and will not be further explained herein. Capacitors 8 and 10 provide a speed-up of state changing by coupling the leading edges of the voltage changes at the collector electrodes of Q1 and Q2 across resistors 7 and 9, respectively. Stated otherwise, it may be said that those capacitors increase the equivalent bandwidth of the circuit and therefore provide for faster change-of-state action.

It will be noted that the emitter of Q3 is coupled to the common emitter point of Q1 and Q2 through a diode D3, the function of which will be more fully understood as this description proceeds.

It will also be noted that a pair of back-to-back diodes D1 and D2, with their commonly connected anodes are also connected to the base of Q3, function in cooperation with resistor 4 to establish the bias voltage appropriate for Q3 at point number 5.

In order to describe the required circuit parameters and also the operation of the circuit, it will be arbitrarily assumed initially that Q3 is a non-conducting state, so that Q1 and Q2 operate as a standard bistable flip-flop would. The collector voltage of the conducting transistor (Q1 and Q2) provides the base bias for Q3 through germanium diode D1 or D2 as appropriate (depending upon which of Q1 or Q2 is conducting). For conduction of Q3 its base voltage must satisfy the following relationship:

$$V_{b3} \text{ on} > V_E + V_{D3} + V_{be3}$$

On the other hand, the off condition bias voltage for Q3 is provided when:

$$V_E + V_{cesat\ 1\ or\ 2} < V_{D\ 1\ or\ 2} < V_E + V_{D3} + V_{be3}$$

The foregoing requirements are insured through the use of germanium diodes for D1 and D2, having a forward drop on the order of 0.3 to 0.5 volts. D3 is a silicon diode having a forward drop of at least 0.7 volts.

For input 3 with Q3 triggered, Q3 will conduct a current large enough to turn off Q1 and Q2, since resistor 3 is smaller than resistors 2 or 6. The resulting rising collector voltages of Q1 and Q2 has the effect of turning off conduction through D1 or D2 and accordingly, the off bias voltage of Q3 is removed. Q3 will remain in the conducting state after input 3 is removed. The circuit will return to its normal state when triggers are applied at input 1 or 2 to bring one of those stages into conduction.

The following table provides a component comparison between the straightforward bistable circuit and the tri-stable configuration of the present invention:

| | BISTABLE | TRI-STABLE | INCREASE |
|---|---|---|---|
| Resistors | 7 | 9 | 2 |
| Transistors | 2 | 3 | 1 |
| Capacitors | 2 | 2 | 0 |
| Diodes | 0 | 3 | 3 |
| Total: | 11 | 17 | 6 = 55% |

The increase is indicated numerically and as a percentage. This minimal increase is of itself a very important aspect of the present invention, and distinguishes it economically as compared to prior art tri-stable circuits for the same or comparable purposes.

Typical component values for instrumenting the invention in the form illustrated are as follows:

| COMPONENT | VALUE |
|---|---|
| Resistors 7 and 9 | 22,000 ohms |
| Resistors 12 and 13 | 9,100 ohms |
| Resistor 11 | 330 ohms |
| Resistors 2 and 6 | 3,300 ohms |
| Resistor 3 | 2,200 ohms |
| Resistor 4 | 47,000 ohms |
| Capacitors 8 and 10 | 100 Pf. |
| Q1, Q2, Q3 | Type 2N2481 |
| D1 and D2 | Type 1N270 |
| D3 | Type 1N914 |

It will be understood that, although NPN transistors are shown with a positive supply terminal providing the transistor collector source, the source negative terminal being grounded, that transistors of the PNP type could as well be used with appropriate modifications in supply voltage and bias polarities.

In general, transistors provide the most practical active elements for instrumentation of the present invention. The generic classes of semi-conductors and related devices suitable for use in the invention are hereinafter sometimes referred to as control devices having two principal current carrying electrodes (ordinarily emitter and collector) and a control electrode (base). The said two principal electrodes form a variable current path through the device under control of the said control electrode.

It will be realized that the circuit of the present invention is of the type which responds to its truth table in accordance with the applied input conditions, and does not require a clock pulse to advance it to the state dictated by a change of said input conditions.

It will also be realized that any two outputs of the device define the state of the circuit and utilization circuits following can be constructed accordingly.

Various modifications and alterations to the device of the present invention will suggest themselves to those skilled in this art. Accordingly, it is not intended that the scope of the present invention should be limited by the drawing or this description, these being typical and illustrative only.

What is claimed is:

1. A tri-stable circuit having input terminals and three output terminals, said circuit being adapted to assume and maintain a stable output memory of signals constituting a binary input condition representative of each of said inputs at a corresponding one of said outputs, during and after application of said signals to said inputs, comprising the combination of:

three current control devices, each having first and second principal current carrying electrodes and at least one control electrode for controlling the current flowing between said principal electrodes;

a common connection among corresponding first ones of said principal electrodes, said second electrodes each being connected to a power supply source through a separate load impedance element;

triggering means comprising a regenerative direct coupled current path between said second principal electrode of each of first and second ones of said current control devices and said control electrode of the other of said first and second control devices;

terminal means including three input terminals connected one to said control electrode of each of said current control devices, and three output terminals connnected one to each of said second principal electrode of each of said current control devices, whereby said binary inputs may be applied to produce said stable output memory;

first biasing means comprising a first bias element having a predetermined voltage drop characteristic inserted in the current path between said first principal electrode of the third of said current control devices and said common connection of said principal electrodes;

and second biasing means comprising a pair of second bias elements connected in series between said second principal electrodes of said first and second current control devices, the mid-point of said second bias elements being connected to said control electrode of said third current control device.

2. Apparatus according to claim 1 in which said first biasing element comprises a semi-conductor diode.

3. Apparatus according to claim 1 in which said pair of second bias elements comprises a pair of semi-conductor diodes connected back to back.

4. Apparatus according to claim 1 in which said first biasing element comprises a semi-conductor diode and said pair of second bias elements comprises a pair of semi-conductor diodes connected back to back.

5. Apparatus according to claim 4 in which said three current control elements are transistors and said control electrodes are the bases of said transistors.

6. Apparatus according to claim 4 in which said diode comprising said first bias element is of the silicon type.

7. Apparatus according to claim 4 in which said pair of second bias elements comprises back-to-back geranium diodes.

8. Apparatus according to claim 4 in which said first bias means comprises a silicon semi-conductor diode connected to employ its forward voltage drop characteristic for biasing said third current control device, and said second biasing means comprises a pair of back-to-back series, germanium semi-conductor diodes, connected to provide bias for control electrode of said third current control device by forward voltage drop characteristic.

* * * * *